US008389459B2

(12) United States Patent
Baldridge et al.

(10) Patent No.: US 8,389,459 B2
(45) Date of Patent: *Mar. 5, 2013

(54) SEPTIC SYSTEM CLEANING COMPOSITIONS

(75) Inventors: John W. Baldridge, Newport Beach, CA (US); Carl W. Podella, Irvine, CA (US)

(73) Assignee: Advanced Biocatalytics Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/038,424

(22) Filed: Mar. 2, 2011

(65) Prior Publication Data

US 2011/0152149 A1    Jun. 23, 2011

Related U.S. Application Data

(60) Division of application No. 12/702,297, filed on Feb. 9, 2010, now Pat. No. 7,922,906, which is a continuation of application No. 11/964,702, filed on Dec. 26, 2007, now Pat. No. 7,658,848, which is a division of application No. 11/373,373, filed on Mar. 10, 2006, now abandoned.

(60) Provisional application No. 60/661,254, filed on Mar. 10, 2005.

(51) Int. Cl.
*C11D 17/06* (2006.01)
*C11D 3/00* (2006.01)

(52) U.S. Cl. ........ 510/392; 510/320; 510/321; 510/393; 435/188; 435/255.1; 435/255.2; 435/255.4; 435/255.6; 252/186.25

(58) Field of Classification Search .................... 510/392
See application file for complete search history.

(56) References Cited

U.S. PATENT DOCUMENTS

| | | | | |
|---|---|---|---|---|
| 4,771,003 A | * | 9/1988 | Stellwag et al. | 435/221 |
| 6,046,152 A | * | 4/2000 | Vinson et al. | 510/428 |
| 2003/0047510 A1 | * | 3/2003 | Baldridge et al. | 210/632 |
| 2004/0180411 A1 | * | 9/2004 | Podella et al. | 435/71.1 |
| 2006/0049119 A1 | * | 3/2006 | Ludensky et al. | 210/755 |

* cited by examiner

*Primary Examiner* — Necholus Ogden, Jr.
(74) *Attorney, Agent, or Firm* — TechLaw LLP; Sam K. Tahmassebi

(57) ABSTRACT

A composition including the fermentation supernatant from a fermentation of yeast is intended to be conveniently introduced through the wastewater plumbing system of a private home or other facility into a septic system servicing the home or other facility to substantially accelerate the ability of the bacteria resident in the septic system to substantially digest biologically available organic compounds present in the septic system, and methods of accomplishing the same.

20 Claims, No Drawings

SEPTIC SYSTEM CLEANING COMPOSITIONS

CROSS-REFERENCE TO RELATED APPLICATIONS

The present application is a divisional of U.S. patent application Ser. No. 12/702,297, filed on Feb. 9, 2010, by Baldridge et al. and entitled "SEPTIC SYSTEM CLEANING METHOD," now U.S. Pat. No. 7,922,906, issued on Apr. 12, 2011, which in turn is a continuation of U.S. patent application Ser. No. 11/964,702, filed on Dec. 26, 2007, by Baldridge et al. and entitled "SEPTIC SYSTEM CLEANING," now U.S. Pat. No. 7,658,848, issued on Feb. 9, 2010, which in turn is a divisional of U.S. patent application Ser. No. 11/373,373, filed on Mar. 10, 2006, by Baldridge et al. and entitled "SEPTIC SYSTEM CLEANING," now abandoned, which in turn claims the benefit of U.S. Provisional Patent Application Ser. No. 60/661,254, entitled "Septic System Cleaning," filed Mar. 10, 2005, all of which applications are hereby incorporated by reference.

FIELD OF THE INVENTION

The present invention relates to a composition including the fermentation supernatant from the fermentation of yeast intended to be conveniently introduced through the wastewater plumbing system of a private home or other facility into a septic system servicing the home or other facility to substantially accelerate the ability of the bacteria resident in the septic system to substantially digest biologically available organic compounds present in the septic system, and methods of accomplishing the same.

BACKGROUND OF THE INVENTION

A significant number of homes in the United States are not connected to a central sewage disposal and treatment system and rely on local septic systems to treat wastewater discharged from the home. Such septic systems typically have a septic tank for receiving the wastewater from the home. The wastewater and the solids entrained in it are deposited in the tank where they are decomposed by the action of bacteria and other micro-organisms. The wastewater itself is eventually discharged into a septic field that surrounds the tank and percolates down through the soil. Grease and similar substances in the wastewater causes the soil of the septic field eventually to coagulate forming in effect a seal, and the wastewater is no longer able to drain away sufficiently quickly for the system to operate properly; an overflow or other dire consequence results. The speed with which such a system failure occurs is dependent on the characteristics and condition of the soil, the amount of wastewater discharged, and the materials found in the wastewater.

It is known in the prior art that fermentation supernatants obtained from the fermentation of certain yeasts, when present in the appropriate concentrations, have the ability to accelerate the natural digestion of biologically available organic compounds present in sewage, sludge, grease, and the like. Examples of such materials are described in U.S. Pat. Nos. 3,635,797, 5,464,766, 5,820,758, 5,879,928, 5,885,950, 5,905,037, and 6,699,391. Typically, the fermentation supernatant with its protein component is combined with other ingredients such as surfactants, buffers, citric and lactic acids, urea, preservatives and the like and then diluted with water to form a protein rich cleaning solution. An example of such a protein rich cleaning solution is ACCELL® cleaning solution, a product containing fermentation supernatant, surfactants, buffers, etc., and available from Advanced BioCatalytics Corporation, of Irvine, Calif., the assignee of the present application. In the ACCELL® cleaning solution, the protein component itself represents about 1.5% by weight of the solution and water represents about 83% by weight. The surfactants, buffers, etc., make up the remainder.

The fermentation supernatant includes a protein component comprised of a variety of proteins produced by an aerobic yeast fermentation process. The aerobic yeast fermentation process is conducted within a reactor having aeration and agitation mechanisms, such as aeration tubes and/or mechanical agitators. The starting materials (liquid growth medium, yeast, sugars, additives) are added to the fermentation reactor and the fermentation is conducted as a batch process. After fermentation, the fermentation product may be subjected to additional procedures intended to increase the yield of proteins produced from the process. Examples of these additional procedures include heat shock of the fermentation product, physical and/or chemical disruption of the yeast cells to release additional polypeptides, lysing of the yeast cells, or other procedures described herein and/or known to those of skill in the art. The yeast cells are removed by centrifugation or filtration to produce a supernatant containing the protein component. Various processes for obtaining the supernatant are disclosed in co-pending application, U.S. Patent Application Publication No. 2005-0245414 (Ser. No. 10/837,312, filed on Apr. 29, 2004), entitled "Improving Surface-Active Properties of Surfactants", and assigned to the assignee of this application. That co-pending application is hereby incorporated by reference herein.

As used herein, the term "protein component" refers to a mixture of proteins that includes a number of proteins having a molecular weight of between about 100 and about 450,000 daltons, and most preferably between about 500 and about 50,000 daltons, and which, when combined with one or more surfactants, enhances the surface-active properties of the surfactants.

In a first example, the protein component comprises the supernatant recovered from an aerobic yeast fermentation process. Yeast fermentation processes are generally known to those of skill in the art, and are described, for example, in the chapter entitled "Baker's Yeast Production" in Nagodawithana T. W. and Reed G., Nutritional Requirements of Commercially Important Microorganisms, Esteekay Associates, Milwaukee, Wis., pp 90-112 (1998), which is hereby incorporated by reference. Briefly, the aerobic yeast fermentation process is conducted within a reactor having aeration and agitation mechanisms, such as aeration tubes and/or mechanical agitators. The starting materials (e.g., liquid growth medium, yeast, a sugar or other nutrient source such as molasses, corn syrup, or soy beans, diastatic malt, and other additives) are added to the fermentation reactor and the fermentation is conducted as a batch process.

After fermentation, the fermentation product may be subjected to additional procedures intended to increase the yield of the protein component produced from the process. Several examples of post-fermentation procedures are described in more detail below. Other processes for increasing yield of protein component from the fermentation process may be recognized by those of ordinary skill in the art.

*Saccharomyces cerevisiae* is a preferred yeast starting material, although several other yeast strains may be useful to produce yeast ferment materials used in the compositions and methods described herein. Additional yeast strains that may be used instead of or in addition to *Saccharomyces cerevisiae* include *Kluyveromyces marxianus, Kluyveromyces lactis,*

*Candida utilis* (Torula yeast), *Zygosaccharomyces, Pichia, Hansanula*, and others known to those skilled in the art.

In the first embodiment, *saccharomyces cerevisiae* is grown under aerobic conditions familiar to those skilled in the art, using a sugar, preferably molasses or corn syrup, soy beans, or some other alternative material (generally known to one of skill in the art) as the primary nutrient source. Additional nutrients may include, but are not limited to, diastatic malt, diammonium phosphate, magnesium sulfate, ammonium sulfate zinc sulfate, and ammonia. The yeast is preferably propagated under continuous aeration and agitation between 30 degrees to 35 degrees C. and at a pH of 4.0 to 6.0. The process takes between 10 and 25 hours and ends when the fermentation broth contains between 4 and 8% dry yeast solids, (alternative fermentation procedures may yield up to 15-16% yeast solids), which are then subjected to low food-to-mass stress conditions for 2 to 24 hours. Afterward, the yeast fermentation product is centrifuged to remove the cells, cell walls, and cell fragments. It is worth noting that the yeast cells, cell walls, and cell fragments will also contain a number of useful proteins suitable for inclusion in the protein component described herein.

In an alternative embodiment, the yeast fermentation process is allowed to proceed until the desired level of yeast has been produced. Prior to centrifugation, the yeast in the fermentation product is subjected to heat-stress conditions by increasing the heat to between 40 and 60 degrees C., for 2 to 24 hours, followed by cooling to less than 25 degrees C. The yeast fermentation product is then centrifuged to remove the yeast cell debris and the supernatant, which contains the protein component, is recovered.

In a further alternative embodiment, the fermentation process is allowed to proceed until the desired level of yeast has been produced. Prior to centrifugation, the yeast in the fermentation product is subjected to physical disruption of the yeast cell walls through the use of a French Press, ball mill, high-pressure homogenization, or other mechanical or chemical means familiar to those skilled in the art, to aid the release of intracellular polypeptides and other intracellular materials. It is preferable to conduct the cell disruption process following a heat shock, pH shock, or autolysis stage. The fermentation product is then centrifuged to remove the yeast cell debris and the supernatant is recovered.

In a still further alternative embodiment, the fermentation process is allowed to proceed until the desired level of yeast has been produced. Following the fermentation process, the yeast cells are separated out by centrifugation. The yeast cells are then partially lysed by adding 2.5% to 10% of a surfactant to the separated yeast cell suspension (10%-20% solids). In order to diminish the protease activity in the yeast cells, 1 mM EDTA is added to the mixture. The cell suspension and surfactants are gently agitated at a temperature of about 25° to about 35° C. for approximately one hour to cause partial lysis of the yeast cells. Cell lysis leads to an increased release of intracellular proteins and other intracellular materials. After the partial lysis, the partially lysed cell suspension is blended back into the ferment and cellular solids are again removed by centrifugation. The supernatant, containing the protein component, is then recovered.

In a still further alternative embodiment, fresh live *Saccharomyces cerevisiae* is added to a jacketed reaction vessel containing methanol-denatured alcohol. The mixture is gently agitated and heated for two hours at 60 degrees C. The hot slurry is filtered and the filtrate is treated with charcoal and stirred for 1 hour at ambient temperature, and filtered. The alcohol is removed under vacuum and the filtrate is further concentrated to yield an aqueous solution containing the protein component.

Additional details concerning the fermentation processes and other aspects of the protein component are described in U.S. Patent Application Publication No. 2004-0180411 (Ser. No. 10/799,529, filed Mar. 11, 2004), entitled "Altering Metabolism in Biological Processes," which is assigned to the assignee of the present application. Still further details concerning these processes and materials are described in the aforementioned U.S. Pat. No. 6,999,391 which is also assigned to the assignee of the present application. This patent application and this patent are hereby incorporated by reference herein.

Among the uses proposed for such protein rich cleaning solutions is the cleaning of septic systems, tanks, and drainage fields. Typically, the protein rich cleaning solution is introduced directly into the targeted material. For example, such a cleaning solution has been continuously introduced into a septic field serving a mobile home community by introducing the solution into a central pumping installation that discharges wastewater into the septic field. In this application, a concentration of about fifteen parts per million of the solution relative to the total water flow through the system was used. U.S. Pat. No. 5,885,950 proposes introducing the cleaning solution directly into the septic tank, and covering the drain field with a further diluted version of the solution and then watering to wash the composition into the drain field. It has also been proposed to treat an individual home's septic system by the application through the plumbing system of a measured dose of the cleaning solution on a weekly basis. In both the latter instances, the treatment has to be periodically repeated, and thus each of these approaches has the disadvantage of requiring the homeowner to do periodic maintenance and add another chore to his schedule, one that can be easily overlooked.

SUMMARY OF THE INVENTION

The clogging up of septic systems and associated drain fields is a problem faced by many homeowners who are not connected to sewer systems. Particularly in the case where the soil of the drain field is not very porous, the septic system tank must periodically be pumped out or a new tank positioned in a different area of the field. While the use of a protein enriched cleaning solution could be used by the homeowner to flush out and maintain the system, the periodic and careful application of the correct amount of the cleaning solution imposes a maintenance duty that many homeowners are not ready to shoulder. In addition, of course, the homeowner would have to buy and store the cleaning solution.

According to the present invention, cleaning of a septic system and its associated drain field can be accomplished with no conscious effort by providing the homeowner with a fermentation supernatant entrained in a liquid carrier such as common household cleaning products used by the homeowner that in ordinary use will be passed through the plumbing system of the home into the septic system. For example, the protein component of the fermentation supernatant, the fermentation supernatant itself, or a protein enriched cleaning solution incorporating it, can be introduced into common household cleaning products which for purposes of this invention is defined to mean liquid products such as dishwasher detergent, washing machine detergent, liquid hand or bath soap, shampoo, toilet bowl cleaner and the like. The term "liquid" as used herein includes gels.

It is therefore an object of the present invention to provide a composition for cleaning a septic system by being introduced into the septic system through the wastewater disposal plumbing system of a house served by the septic system comprising a common household cleaning product carrier liquid, and a protein component from the fermentation of yeast intermixed with the carrier liquid, the protein component being present in an amount sufficient relative to the total wastewater flow through the septic system to substantially accelerate the ability of the bacteria resident in the septic system to digest biologically available organic compounds present in the septic system.

It is another object of the present invention to provide a method of cleaning a septic system servicing a house having a wastewater plumbing system within the house discharging into the septic system comprising introducing into the wastewater plumbing system a liquid comprising a common household cleaning product carrier and a protein component from the fermentation of yeast, the protein component being present in an amount sufficient relative to the total wastewater flow through the septic system to substantially accelerate the ability of the bacteria resident in the septic system to digest biologically available organic compounds present in the septic system.

Other objects and advantages of the invention will be apparent from the following description and claims.

DESCRIPTION OF THE PREFERRED EMBODIMENTS

The present invention recognizes that the average American household uses a number of products that literally end up down the drain, and takes advantage of that fact to use these products to introduce into the drain, and hence into a septic system, a protein enriched cleaning solution. According to the present invention, this can be accomplished by adding a fermentation supernatant to a liquid carrier comprising a common household cleaning product in an amount sufficient relative to the total wastewater flow through the septic system to substantially accelerate the natural digestion of biologically available organic compounds present in the septic system by the bacteria resident in the septic system. Because the concentration of the supernatant necessary to adequately perform the cleaning function is dependent on the content of the wastewater, the amount of wastewater produced, and the nature and condition of the soil into which the wastewater will be discharged, it will be recognized by those skilled in the art that it is not possible to state with precision the amount of fermentation supernatant that must be used in connection with any particular septic system. Based on field tests on various wastewater systems using ACCELL® cleaning solution, it is estimated that a concentration of about 1 to 15 parts per million of ACCELL® cleaning solution in the wastewater would be appropriate for most, if not all, septic systems.

Although estimates of the amount of water used, and wastewater produced, per capita in a home vary from place to place and time to time, one figure to consider as a basis for determining the amount of fermentation supernatant that must be introduced into the plumbing system to adequately clean the septic system is about 186 liters (about 49 gallons) of water per day per person. See, e.g., the estimate of the American Water Works Association for 1997 reported in Pipeline, Winter 2002, Vol. 13, No. 1, at page 5. According to this report, use of the clothes washer contributes 42.4 liters to the total; the shower/bath contributes 39.4 liters; the toilet, 37.9 liters; faucets, 56.4 liters; and the dishwasher, 4.2 liters. For a family of four, the wastewater produced on a daily basis would be about 200 gallons, or 1400 gallons per week. Assuming a mid-range value of 10 ppm. of ACCELL® cleaning solution would be required, it would be desirable to introduce about ⅛ of an ounce of ACCELL® cleaning solution into the home's wastewater on a daily basis.

This can be accomplished by adding the ACCELL® cleaning solution into one or more of the commonly used household products mentioned above. Take, for example, a liquid clothes washer detergent. Liquid TIDE® detergent recommends using about 3 ounces of detergent per normal wash. If 12.5 ounces of ACCELL® cleaning solution was added to a 300 ounce container of liquid TIDE® detergent, or if 12.5 ounces of the detergent was replaced with the ACCELL® solution, a daily clothes washing would add a sufficient amount of a protein rich cleaning solution to treat the septic system. Since the ACCELL® cleaning solution has a water content of about 80%, and a typical liquid detergent also contains a large percentage of water, the ACCELL® solution could also be substituted for water during the formulation of the detergent. It is preferred that the substitution or addition of ACCELL® cleaning solution be made to a detergent or other common household cleaning product in which the surface active agents in the product are non-ionic, anionic, or amphoteric.

Another estimate of residential water usage has been made by the City of Portland, Oreg. It reported that the per capita residential use of water ranged from 10 gallons per day to 600 gallons per day with an average of 140 gallons per day. Of these 140 gallons, it was estimated that 30 gallons were used for showers, 5 gallons for flushing the toilet, 40 gallons for washing clothes and 40 gallons for washing dishes. This wide range of water usage demonstrates another advantage of the cleaning solution compounds and methods of the present invention. This greater flow of water through the system would require an additional amount of fermentation supernatant to be introduced into the septic system. But the increased use of water is accompanied by an increased use of the common household cleaning products serving as carriers for the fermentation supernatant, and thus increased, or decreased, water consumption, whether caused by greater use per capita, or the presence of more people in a home, is compensated for automatically by the introduction of more or less of the fermentation supernatant. In other words, the use of the cleaning solution compounds and methods of the present invention is effectively self-metering.

The example above postulates the direct introduction or substitution of a protein rich cleaning solution into the common household cleaning product. Alternatively, a fermentation supernatant of the type described above, before the addition of surfactants, buffers, etc., could be incorporated into the formulation of the detergent, either in addition to, or in place of, the enzymes commonly used in detergents. In an article entitled "Formulating Liquid Detergents For Multiple Enzyme Stability", in the January 2004 issue of HAPPI, a proposed premium liquid laundry detergent formulation is given on page 98. That formulation includes 53.36% by weight of water and 1.6% by weight of the enzymes protease and amylase. The formulation also includes surfactants, buffers and other agents. By simply replacing the water and enzymes of this formula with the fermentation supernatant such as that present in ACCELL® cleaning solution a detergent with the advantages of the present invention would be obtained at no significant additional cost. As disclosed in the aforementioned application Ser. No. 10/837,312, filed on Apr. 29, 2004, the additional advantage of improved surface active properties of the surfactants would be obtained by this replacement.

Similar additions or substitutions could be made to other common household cleaning products such as dishwasher detergent, toilet cleaners, liquid soaps, shampoos, and the like to insure that the cumulative amount of the protein component of the fermentation supernatant was passed into the septic system.

Although the above is complete description of the preferred embodiments of the invention, various alternatives, additions, modifications and improvements may be made without departing from the scope thereof, which is defined by the claims.

What is claimed is:

1. A composition for cleaning a septic system comprising a cleaning product carrier, selected from the group consisting of dishwasher detergent, toilet bowl cleaner, washing machine detergent, liquid hand or bath soap, and shampoo, and a protein component comprising yeast stress proteins resulting from subjecting a mixture obtained from the yeast fermentation to stress, the protein component being present in an amount sufficient relative to the total wastewater flow through the septic system to substantially accelerate the ability of the bacteria resident in the septic system to digest biologically available organic compounds present in the septic system, wherein the protein component comprises a mixture of multiple intracellular proteins, at least a portion of the mixture including yeast polypeptides obtained from fermenting yeast and yeast heat shock proteins resulting from subjecting a mixture obtained from the yeast fermentation to stress.

2. The composition of claim 1, wherein the protein component is from aerobic fermentation of yeast.

3. The composition of claim 1, wherein the protein component comprises proteins obtained from exposing a product obtained from the fermentation of yeast to additional procedures that increase the yield of proteins produced from the fermentation.

4. The composition of claim 1, wherein the stress is selected from the group consisting of heat shock of the fermentation product, physical and/or chemical disruption of the yeast cells to release additional polypeptides, and lysing of the yeast cells.

5. The composition of claim 1, wherein the stress comprises exposing a product obtained from the fermentation of yeast to heat shock conditions.

6. The composition of claim 1, wherein the stress comprises physically disrupting the yeast after the fermentation of the yeast.

7. The composition of claim 1, wherein the stress comprises chemically disrupting the yeast after the fermentation of the yeast.

8. The composition of claim 1, wherein the stress comprises lysing the yeast after the fermentation of the yeast.

9. A composition for cleaning a septic system comprising a cleaning product carrier, selected from the group consisting of dishwasher detergent, toilet bowl cleaner, washing machine detergent, liquid hand or bath soap, and shampoo, and a fermentation supernatant from the fermentation of yeast, the fermentation supernatant comprising yeast stress proteins resulting from subjecting a mixture obtained from the yeast fermentation to stress, the fermentation supernatant being present in an amount sufficient relative to the total wastewater flow through the septic system to substantially accelerate the ability of the bacteria resident in the septic system to digest biologically available organic compounds present in the septic system, wherein the fermentation supernatant comprises a mixture of multiple intracellular proteins, at least a portion of the mixture including yeast polypeptides obtained from fermenting yeast and yeast heat shock proteins resulting from subjecting a mixture obtained from the yeast fermentation to stress.

10. The composition of claim 9, wherein the fermentation supernatant is from aerobic fermentation of yeast.

11. The composition of claim 9, wherein the stress comprises exposing a product obtained from the fermentation of yeast to heat shock conditions.

12. The composition of claim 9, wherein the stress comprises physically disrupting the yeast after the fermentation of the yeast.

13. The composition of claim 9, wherein the stress comprises chemically disrupting the yeast after the fermentation of the yeast.

14. The composition of claim 9, wherein the stress comprises lysing the yeast after the fermentation of the yeast.

15. A composition for cleaning a septic system comprising: a cleaning product carrier, selected from the group consisting of dishwasher detergent, toilet bowl cleaner, washing machine detergent, liquid hand or bath soap, and shampoo, and a protein enriched cleaning solution containing a protein component from the fermentation of yeast, wherein the protein component comprises yeast stress proteins resulting from subjecting a mixture obtained from the yeast fermentation to stress, the protein rich cleaning solution being present in an amount sufficient relative to the total wastewater flow through the septic system to substantially accelerate the ability of the bacteria resident in the septic system to digest biologically available organic compounds present in the septic system, wherein the protein component comprises a mixture of multiple intracellular proteins, at least a portion of the mixture including yeast polypeptides obtained from fermenting yeast and yeast heat shock proteins resulting from subjecting a mixture obtained from the yeast fermentation to stress.

16. The composition of claim 15, wherein the protein component is from aerobic fermentation of yeast.

17. The composition of claim 15, wherein the stress comprises exposing a product obtained from the fermentation of yeast to heat shock conditions.

18. The composition of claim 15, wherein the stress comprises physically disrupting the yeast after the fermentation of the yeast.

19. The composition of claim 15, wherein the stress comprises chemically disrupting the yeast after the fermentation of the yeast.

20. The composition of claim 15, wherein the stress comprises lysing the yeast after the fermentation of the yeast.

* * * * *